United States Patent Office 3,623,354
Patented Nov. 30, 1971

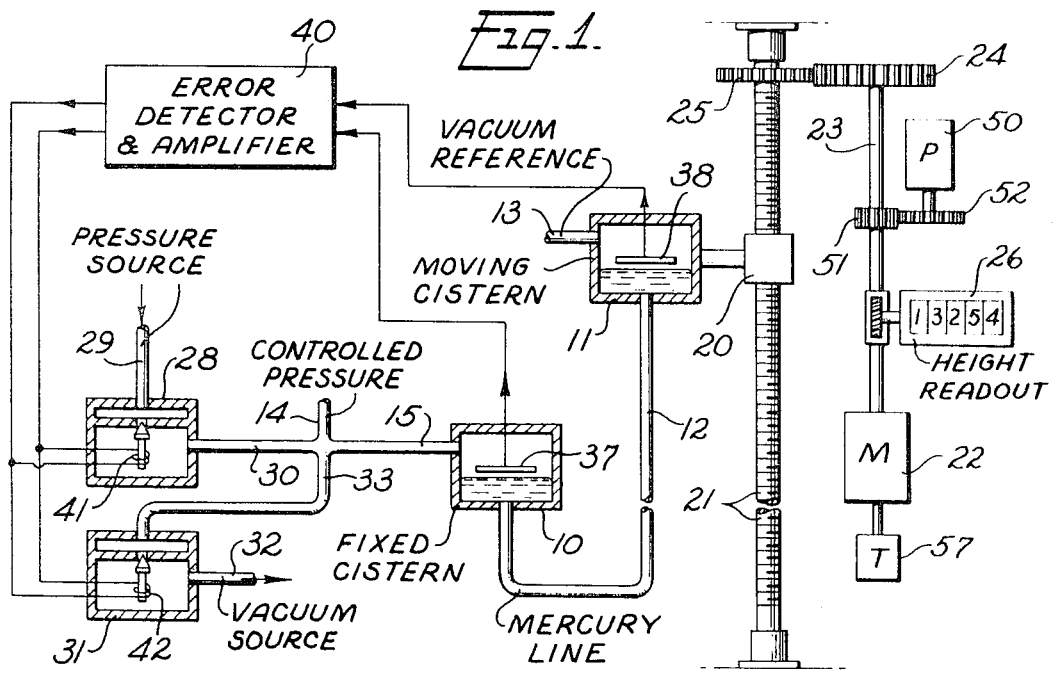
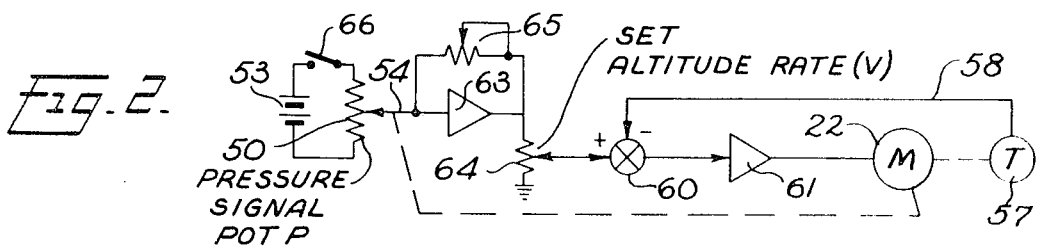
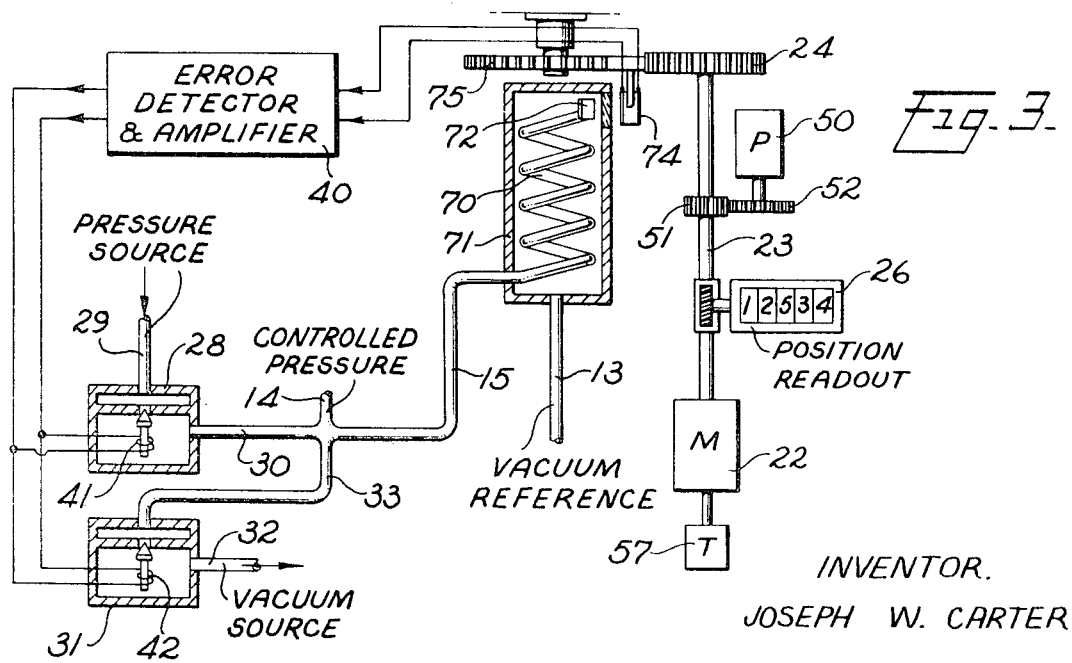

3,623,354
PRESSURE GAUGE WITH ALTITUDE
RATE GENERATOR
Joseph W. Carter, Pomona, Calif., assignor to Schwien
Engineering, Inc., Pomona, Calif.
Filed Dec. 10, 1969, Ser. No. 883,860
Int. Cl. G01l 27/00
U.S. Cl. 73—4 R
5 Claims

ABSTRACT OF THE DISCLOSURE

A pressure controller incorporating a pressure gauge such as a manometer or Bourdon tube and providing an output pressure corresponding to altitude. Apparatus for generating pressure change to represent a constant rate of change of altitude. A controller for the altitude or pressure drive motor including a potentiometer driven by the motor to provide a signal proportional to pressure and a tachometer driven by the motor to provide a velocity feedback signal proportional to pressure rate, with the pressure and pressure rate signals combined as the input to the drive motor to produce the output pressure change corresponding to the constant rate of change of altitude.

---

This invention relates to pressure controllers and in particular, to new and improved apparatus for operating a pressure controller to generate a changing pressure which represents a constant rate of change of altitude.

Present day jet powered aircraft use an instrument, generally identified as an air data computer, for rapid calculation of information utilized in piloting of the aircraft. The air data computer has a number of inputs including pressure altitude, indicated air speed, and temperature, and provides several calculated outputs including true air speed, density altitude, and vertical velocity or rate of climb.

The vertical velocity or rate of climb or rate of change of altitude is primarily a function of the change in pressure. In the calibration of air data computers, it is desirable to have as an input, a controlled pressure which varies in a manner which represents a constant rate of change of altitude. This is not readily accomplished with conventional pressure sources since the relation of pressure to altitude is an exponential relation.

Various forms of pressure controllers are known and are available on the market. These instruments incorporate some form of pressure gauge, such as a manometer or Bourdon tube, a mechanism for driving the gauge to a position corresponding to a desired output pressure, valves for mixing a pressure source and a vacuum source to produce an output pressure, and means for controlling the valve as a function of the difference between the actual output pressure and the desired output pressure to produce the desired pressure. Two variations of the manometer type of pressure controller are shown in U.S. Patent No. 3,225,599. It is an object of the present invention to provide apparatus for operating a pressure controller to generate an output pressure changing in a manner representing a constant rate of change of altitude. An additional object is to provide apparatus which is suitable for use with various types of pressure controllers.

A typical pressure controller includes a drive motor for driving the pressure gauge to a position. A typical embodiment of the present invention includes a potentiometer driven by the drive motor to provide a signal corresponding to the pressure represented by the pressure gauge position, a tachometer driven by the drive motor to provide a signal representing the velocity of the drive motor which is the pressure rate of change, and means for combining these two signals in opposing relation to provide the input for the drive motor. When the apparatus is turned on, the pressure controller will be driven from the starting point to the end point at an exponentially varying rate to provide an output pressure representing a constant rate of change of altitude.

Other objects, advantages, features and results will more fully appear in the course of the following description. The drawing merely shows and the description merely describes preferred embodiments of the present invention which are given by way of illustration or example.

In the drawing:

FIG. 1 is a diagram of a mercury manometer type of pressure controller incorporating a preferred embodiment of the present invention;

FIG. 2 is an electrical diagram of the rate of change of altitude control apparatus of FIG. 1; and FIG. 3 is a diagram similar to FIG. 1 illustrating the application of the invention to a Bourdon tube type of pressure controller.

The pressure controller of FIG. 1 includes a pressure gauge in the form of a mercury manometer of the type shown in U.S. Patents Nos. 3,225,599 and 3,296,867. A pool of mercury in a fixed cistern 10 is connected to a pool of mercury in a moving cistern 11 by a line 12. A vacuum reference is connected to the moving cistern 11 above the mercury pool via a line 13. The controlled pressure appears on an output line 14 and is connected to the fixed cistern above the mercury pool via line 15.

The moving cistern 11 is supported on a carrier 20 which is moved vertically by a lead screw 21 driven by a motor 22 through an output shaft 23 and gears 24, 25. A height readout unit 26 may be coupled to the shaft 23 to provide a visual indication of the position of the moving cistern 11. The height readout unit provides an indication of the difference in elevation of the cisterns 10, 11 and may be calibrated to read in inches of mercury or in pressure units or otherwise as desired.

A pressure source is connected to a control valve 28 via a line 29 with the valve output connected to line 14 via a line 30. A vacuum source is connected to a control valve 31 by a line 32, with the valve output connected to the line 14 by a line 33. The magnitude of the pressure at the output line 14 and at the fixed cistern 10 is determined by the settings of the valves 28, 31.

A capacitor plate 37 is mounted in the cistern 10 above the mercury pool, with the plate 37 and the surface of the pool forming a capacitor. Another capacitor plate 38 is similarly mounted in the cistern 11 to provide another capacitor. The plates 37, 38 are connected to a bridge circuit in an error detector and amplifier unit 40 to provide an error signal output when there is a difference in the spacing of the pools of mercury from their respective fixed capacitor plates. The output of the error detector and amplifier unit 40 is connected to solenoid coils 41, 42 in the valves 28, 31 respecitvely, for controlling the setting of the valves.

The apparatus as described thus far is found in conventional pressure controllers and can be operated to provide a desired output pressure at the output line 14. The moving cistern 11 is driven vertically to a position corresponding to the desired output pressure. This may be accomplished by energizing the motor 22 to drive the cistern 11 until the appropriate reading is noted at the readout unit 26. As the cistern moves, there will be an error signal output from the bridge circuit in the unit 40 which is used to adjust the valves 28, 31 to develop a pressure in the output line and the fixed cistern to bring the system back to a balanced or null condition. When the moving cistern is at the desired position and the bridge circuit output is at a null condition, the pressure at the output line 14 will be the desired pressure.

A continuously changing pressure can be provided at the output line 14 by continuously moving the cistern 11. The purpose of the present invention is to provide such a continuously changing output pressure which has a particular characteristic, namely, a pressure change which represents a constant rate of change of altitude. This cannot be achieved by driving the moving cistern at a constant vertical rate.

It has been found that for a constant time rate of change of altitude, the time rate of change of pressure is a function of the actual pressure which function is obtained from pressure-altitude tables. The apparatus of the invention provides for driving the moving cistern in a nonlinear fashion to employ this relationship and obtain the desired output.

Referring to FIGS. 1 and 2, a potentiometer 50 is driven by the motor 22 via gears 51, 52. The potentiometer 50 is connected across a battery 53 and the electrical voltage appearing at the moving arm 54 of the potentiometer varies as a function of the height of the moving cistern 11. This voltage is sometimes referred to as the pressure signal. The potentiometer 50 is one form of altitude means.

A tachometer 57 is driven by the motor 22. The tachometer 57 provides an electrical signal on line 58 which varies as a function of the speed of the motor 22. This signal is sometimes referred to as the feedback signal or pressure rate signal. In the preferred embodiment, the feedback signal varies linearly with the speed of the motor, permitting use of a conventional tachometer generator.

The pressure signal at the potentiometer arm 54 and the feedback signal on the line 58 may be combined at a summing junction 60 in opposing relation to provide an input signal for an amplifier 61 which provides the power to drive the motor 22. The potentiometer arm 54 is preferably connected through an amplifier 63 to one end of another potentiometer 64, with the other end of potentiometer 64 connected to circuit ground and with the arm of potentiometer 64 connected to the summing junction 60. A variable resistor 65 may be connected across the amplifier 63 to provide for scaling of the amplifier. The potentiometer 64 provides for setting the rate of change of altitude to a desired value for a particular run.

In operation, the moving cistern 11 is driven to the desired starting point and the potentiometer 64 is set for the desired constant rate of change of altitude. When the system is started, as by closing switch 66, the motor 22 will drive the moving cistern 11 at a variable rate which will produce an output pressure at output line 14 which changes magnitude in a nonlinear fashion representing a constant or linear rate of change of altitude and this continues until the system is stopped, which may occur when a calibration run is completed or when the cistern reaches the end of its permissible travel.

Thus it is seen that the desired continuously varying output pressing changing to represent a constant rate of change of altitude may be achieved with a conventional pressure controller in combination with a set of components for the pressure controller drive motor.

FIG. 3 illustrates the use of the invention with a pressure controller incorporating a pressure gauge of the Bourdon tube type. Components corresponding to those of FIG. 1 are identified by the same reference numerals.

In the Bourdon tube type of pressure gauge, a Bourdon tube 70 in helical form is prositioned within a chamber 71. The chamber is connected to a vacuum reference via line 13. One end of the tube 70 is connected to the output line 14 via line 15. The other end of the tube 70 is closed and a mirror 72 is carried thereon.

A light source and pickup unit 74 is mounted on a table 75 which is driven in rotation about the axis of the tube 70 by the motor 22 via the shaft 23 and gear 24. At least the upper portion of the chamber 71 is transparent, permitting light to be directed from the source in the unit 74, to the mirror 72 and back toward the pickup in the unit 74.

In operation, the pressure controller of FIG. 3 functions to vary the pressure in the output line 14 and in the tube 70 to maintain a particular alignment between the mirror 72 and the unit 74. A different output pressure is obtained by energizing the motor 22 to rotate the table 75 to a new position. An error signal is developed by the unit 74 and the error detector and amplifier 40 indicating nonalignment and the valves 28, 31 are actuated to change the controlled pressure which causes the tube 70 to unwind or wind up, depending upon the direction of the error, and bring the mirror 72 back into alignment with the unit 74.

The circuitry as illustrated in FIG. 2 is equally applicable to the apparatus of FIG. 3 and functions to operate the apparatus of FIG. 3 to provide the pressure change representing a constant rate of change of altitude in the same manner as described with the apparatus of FIG. 1.

While two exemplary embodiments of the invention have been disclosed and discussed, it will be understood that the invention may be applied to other types of pressure controllers and that the embodiments disclosed may be subjected to various changes, modifications and substitutions without necessarily departing from the spirit of the invention.

I claim:

1. In a pressure controller providing an output pressure corresponding to altitude, apparatus for generating a pressure change to represent a constant rate of change of altitude, said pressure controller including a pressure gauge, means for generating an output pressure varying as a function of a setting of said pressure gauge, and drive means for varying said setting, the improvement comprising in combination:
altitude means for generating a pressure signal varying as a function of said setting of said pressure gauge and including a potentiometer with the moving arm driven by said drive means;

feedback means for generating a feedback signal varying as a function of the output of said drive means; and combining means for combining said pressure and feedback signals in opposing relation as an input for said drive means.

2. Apparatus as defined in claim 1 in which said drive means includes a motor and in which said feedback means includes a tachometer driven by said motor and having an output varying linearly with the speed of said motor, and in which the moving arm of said altitude means potentiometer is driven by said motor.

3. In a pressure controller providing an output pressure corresponding to altitude, apparatus for generating a pressure change to represent a constant rate of change of altitude, said pressure controller including:

an output pressure line, valve means for connectig a pressure source and a vacuum source to said output pressure line, a pressure gauge having a first input for a reference value and a second input connected to said output pressure line, drive means for driving said pressure gauge to a position corresponding to a desired output pressure, detector means for detecting a deviation of the output pressure from said desired output pressure and producing an error signal varying as a function of said deviation, and control means having said error signal as an input for controlling said valve means to vary the output pressure to produce said desired output pressure, the improvement comprising in combination:
altitude means for generating a pressure signal varying as a function of said position of said pressure gauge and including a potentiometer with the arm driven by said drive means in synchronism with the driving of said pressure gauge;

feedback means for generating a feedback signal varying as a function of the output of said drive means and including a tachometer driven by said drive means providing an output varying linearly with the speed of said drive means; and combining means for combining said pressure and feedback signals in opposing relation as an input for said drive means.

4. In a pressure controller providing an output pressure corresponding to altitude, apparatus for generating a pressure change to represent a constant rate of change of altitude, said pressure controller including a pressure gauge having a manometer with a moving cistern, means for generating an output pressure varying as a function of a setting of said pressure gauge, and drive means for varying said setting and having a motor for moving said moving cistern, the improvement comprising in combination:

altitude means for generating a pressure signal varying as a function of said setting of said pressure gauge and including a potentiometer driven by said motor in synchronism with said moving cistern;

feed-back means for generating a feed-back signal varying as a function of the output of said drive means; and combining means for combining said pressure and feed-back signals in opposing relation as an input for said drive means.

5. In a pressure controller providing an output pressure corresponding to altitude, apparatus for generating a pressure change to represent a constant rate of change of altitude, said pressure controller including a pressure gauge having a Bourdon tube and a moving tube-angle detection unit, means for generating an output pressure varying as a function of a setting of said pressure gauge, and drive means for varying said setting and having a motor for moving said detection unit, the improvement comprising in combination:

altitude means for generating a pressure signal varying as a function of said setting of said pressure gauge and including a potentiometer driven by said motor in synchronism with said detection unit;

feed-back means for generating a feed-back signal varying as a function of the output of said drive means; and combining means for combining said pressure and feed-back signals in opposing relation as an input for said drive means.

References Cited

UNITED STATES PATENTS

| | | | |
|---|---|---|---|
| 2,893,236 | 7/1959 | Coon et al. | 73—4 R |
| 3,296,867 | 1/1967 | Schwien | 73—401 |

S. CLEMENT SWISHER, Primary Examiner

W. A. HENRY II, Assistant Examiner

U.S. Cl. X.R.

137—81